3,069,335
PREPARATION OF AN ALUMINA BASED CATALYST
Klaus Bonath, Kronberg, Taunus, and Friedrich Endter, Constance, Germany, and Douglas A. C. De Rycke, Woolton, Liverpool, John Augustus Lewis, Widnes, and Alan Rippon, Liverpool, England, assignors to Peter Spence & Sons Limited, Widnes, England, a British company, and Deutsche Gold- und Silber-Scheideanstalt, vormals Roessler, Frankfurt am Main, Germany, a German company
No Drawing. Filed Mar. 7, 1961, Ser. No. 93,884
Claims priority, application Great Britain Mar. 18, 1960
5 Claims. (Cl. 204—96)

This invention relates to a method of preparation of an alumina based catalyst containing at least one additional metal value.

Very many catalysts of commercial importance are those consisting essentially of alumina together with a minor proportion of a metal value, as for example $Al_2O_3/Pt$ reforming catalyst.

Hitherto the methods of making such catalysts fall into the general types as follows:

(a) Coprecipitation of the oxides or hydroxides of aluminium and the metal value, or the variant, in which the metal value is added to the freshly precipitated alumina;

(b) Preparation of the alumina base as a separate entity with subsequent impregnation thereof in a solution of the metal value, or with subsequent dry mixing or sublimation of the metal value.

The disadvantages of the first such method lie in that the alumina is precipitated rapidly and adsorbs the metal values from the stirred solution, that very close control is necessary if wastage of reagents is to be avoided and the final catalytic product is not readily reproducible either in formulation or in activity.

The disadvantage of the second method lies in the availability of an alumina of considerably less surface area, since the initial alumina precipitate, although it possesses a very high surrface area at the moment of formation, is believed to have a very much reduced area in a matter of seconds (see for example Weiser, Milligan and Purcell, Ind. Eng. Chem. 1940, 32, 1487–90).

The present invention utilises an alumina of very high surface area and in the preferred method prepares it by the electrolysis of aluminium metal.

Accordingly the invention provides a method of manufacture of an alumina based catalyst containing at least one additional metal value, by electrolysis of aluminium metal in presence of a salt of said additional metal value, separation of the resultant product and, if desired, drying and calcination thereof.

The invention makes possible the production of a dispersion of metal value on alumina to a much higher degree than hitherto possible. It is thought that, in the invention, aluminium ions are caused to move in to a pH region in which they hydrate and precipitate. Where the salt of an additional metal value is present the ions thereof are impelled by the applied potential into the same region as the high surface area hydrous alumina precipitate and are intimately coprecipitated therewith or adsorbed thereon.

The electrodes may both be of aluminium, or only one may be of aluminium. Systems employing dissimilar electrodes, for example platinum as the cathode, may be employed.

In a preferred form of the invention the metal value is fed substantially continuously as a solution into the electrolysis bath during the entire course of the electrolysis, the amount of metal value introduced being such as to give a final alumina/metal value product of the requisite analysis. This substantially continuous feed effects an even distribution of the metal value on the alumina and yields a homogeneous product. Whilst addition of the metal value in liquid form is preferred, it may be added as a soluble salt in solid form. Consideration of the application of the catalyst makes possible the avoidance of components which will be undesirable for the specific purpose envisaged. For example, halide or sulphate radicals may be objectionable. The invention may be advantageous in that selection of a particular derivative of the metal value is simple. In cases in which inorganic anions are not wanted in the final product, the main electrolyte anion, and the anion of the salt of the active metal value can conveniently be formate.

The invention will now be further described by way of examples.

*Example 1*

An electrolytic cell comprising a bath of ammonium formate 8 litres in volume, and aluminium anode of approximately 1000 sq. cms. area and cathode of approximately 1300 sq. cms. area produced some 60 gms. of alumina per day when employing a current density of 0.005 amp./sq. cm. 430 gms. of an aqueous solution of 2% by weight nickel formate was introduced over 24 hours. The resultant product after filtration, drying and calcination was a catalyst of formulation 5% NiO, 95% $Al_2O_3$, which had a very even appearance.

Where all the nickel formate was added at the start of the electrolysis, an obviously heterogeneous catalyst resulted.

*Example 2*

The procedure of Example 1 was repeated using an aqueous solution of cobalt formate instead of the solution of nickel formate. The resultant product after filtration, drying and calcination was a claret coloured glassy solid in which any unevenness would at once have been apparent. There was no such unevenness.

*Example 3*

In the same electrolytic process as in Example 1, the nickel formate solution was replaced by 500 gms. of a 0.0052% by weight solution of hydrochloroplatinic acid ($H_2PtCl_6.6H_2O$) in 5% by volume aqueous hydrochloric acid. The resulting alumina, on filtering, drying and calcining, gave a catalyst having 0.01% by weight Pt thereon.

Spectrographic analysis of very small samples may be used to show that the active metal is evenly distributed.

In this preparation, it was assumed that chloride ions can be tolerated in a platinum catalyst which has otherwise to be substantially pure.

We claim:

1. A process for the manufacture of a solid catalyst composition comprising alumina as the major part and a metal value selected from the group of metals consisting of nickel, cobalt and platinum and oxides thereof as the minor part, which comprises establishing an electrolytic cell wherein the anode is of aluminium, charging said cell with an aqueous solution of an electrolyte containing said metal value, electrolysing said solution to form an alumina precipitate, separating the resultant precipitate from the aqueous solution, drying said precipitate, and calcining said dried precipitate to form said catalyst composition.

2. A process for the manufacture of a solid catalyst composition comprising alumina as the major part and nickel oxide as the minor part, which comprises establishing an electrolytic cell having an aluminium anode and an aluminium cathode, charging said cell with an aqueous solution of ammonium formate, electrolysing said solution to form an alumina precipitate and during substantially the entire extent of said electrolysis passing an aqueous solution of nickel formate into said electrolytic cell, separating the resultant precipitate from the aqueous solutions, drying said precipitate, and calcining said dried precipitate to form said catalyst composition.

3. A process for the manufacture of a solid catalyst composition comprising alumina as the major part and cobalt oxide as the minor part, which comprises establishing an electrolytic cell having an aluminium anode and an aluminium cathode, charging said cell with an aqueous solution of ammonium formate, electrolysing said solution to form an alumina precipitate and during substantially the entire extent of said electrolysis passing an aqueous solution of cobalt formate into said electrolytic cell, separating the resultant precipitate from the aqueous solutions, drying said precipitate, and calcining said dried precipitate to form said catalyst composition.

4. A process for the manufacture of a solid catalyst composition comprising alumina as the major part and platinum as the minor part, which comprises establishing an electrolytic cell having an aluminium anode and an aluminium cathode, charging said cell with an aqueous solution of ammonium formate, electrolysing said solution to form an alumina precipitate and during substantially the entire extent of said electrolysis passing an aqueous solution of hydrochloroplatinic acid into said electrolytic cell, separating the resultant precipitate from the aqueous solutions, drying said precipitate, and calcining said dried precipitate to form said catalyst composition.

5. A process for the manufacture of a solid catalyst composition comprising alumina as the major part and nickel oxide as the minor part, which comprises establishing an electrolytic cell having an aluminum anode and an aluminium cathode, charging said cell with an aqueous solution of nickel formate, electrolysing said solution at a current density of about 0.005 amp./sq. cm., separating the resultant precipitate from the aqueous solution, drying said precipitate, and calcining said dried precipitate to form said catalyst composition.

References Cited in the file of this patent
UNITED STATES PATENTS

| | | |
|---|---|---|
| 1,514,737 | Smith | Nov. 11, 1924 |
| 2,854,390 | McNeil et al. | Sept. 30, 1958 |
| 2,880,139 | Lewin et al. | Mar. 31, 1959 |
| 2,984,606 | Bergmann et al. | May 16, 1961 |